(12) United States Patent
Quanci et al.

(10) Patent No.: US 12,420,335 B2
(45) Date of Patent: *Sep. 23, 2025

(54) LOW-CARBON GRANULATED METALLIC UNITS

(71) Applicant: SUNCOKE TECHNOLOGY AND DEVELOPMENT LLC, Lisle, IL (US)

(72) Inventors: John Francis Quanci, Haddonfield, NJ (US); John Michael Richardson, Devon, PA (US); Patrick James Mullarkey, Manhattan, IL (US); David James Schwake, Aurora, IL (US); Andrew Michael Butor, Cranberry Township, PA (US); Jonathan Hale Perkins, Lisle, IL (US); Chun Wai Choi, Lisle, IL (US)

(73) Assignee: SUNCOKE TECHNOLOGY AND DEVELOPMENT LLC, Lisle, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/882,256

(22) Filed: Sep. 11, 2024

(65) Prior Publication Data

US 2025/0083224 A1    Mar. 13, 2025

Related U.S. Application Data

(60) Provisional application No. 63/581,946, filed on Sep. 11, 2023.

(51) Int. Cl.
*B22F 1/05* (2022.01)
*B22D 41/12* (2006.01)
(Continued)

(52) U.S. Cl.
CPC ............... *B22F 1/05* (2022.01); *B22D 41/12* (2013.01); *B22F 9/04* (2013.01); *B22F 9/08* (2013.01);
(Continued)

(58) Field of Classification Search
CPC .... B22F 1/05; B22F 2301/35; B22F 2304/15; B22F 2999/00; B22F 9/04; B22F 9/08;
(Continued)

(56) References Cited

U.S. PATENT DOCUMENTS

| 2,052,783 A | 9/1936 | Mart |
| 3,316,075 A | 4/1967 | Grady |

(Continued)

FOREIGN PATENT DOCUMENTS

| CN | 1847411 A | 10/2006 |
| CN | 101301683 A | 11/2008 |

(Continued)

OTHER PUBLICATIONS

International Iron Metallics Association (IIMA), "Use of Granulated Pig Iron (GPI) in the Electric Arc Furnace (EAF)," downloaded Nov. 30, 2024, dated 2018 (no month) (two pages) [wayback machine date of Feb. 9, 2022]. (Year: 2018).*

(Continued)

*Primary Examiner* — Michael E. La Villa
(74) *Attorney, Agent, or Firm* — Perkins Coie LLP

(57) ABSTRACT

A low-carbon granulated metallic unit having a mass fraction of carbon between 0.1 wt. % and 4.0 wt. % is disclosed herein. Additionally or alternatively, the granulated metallic unit can comprise a mass fraction of phosphorous of at least 0.025 wt. %, a mass fraction of silicon between 0.25 wt. % and 1.5 wt. %, a mass fraction of manganese of at least 0.2 wt. %, a mass fraction of sulfur of at least 0.0001 wt. %, and/or a mass fraction of iron of at least 94.0 wt. %.

20 Claims, 5 Drawing Sheets

(51) Int. Cl.

| | | |
|---|---|---|
| B22F 9/04 | (2006.01) | |
| B22F 9/08 | (2006.01) | |
| B61D 7/02 | (2006.01) | |
| B61D 7/32 | (2006.01) | |
| B61D 17/18 | (2006.01) | |
| B61K 13/00 | (2006.01) | |
| C02F 1/52 | (2023.01) | |
| C21B 5/00 | (2006.01) | |
| C21B 7/14 | (2006.01) | |
| C21B 13/00 | (2006.01) | |
| C21C 5/52 | (2006.01) | |
| C21C 7/00 | (2006.01) | |
| C21C 7/064 | (2006.01) | |
| C21C 7/068 | (2006.01) | |
| C22C 33/00 | (2006.01) | |
| C22C 33/02 | (2006.01) | |
| C22C 38/00 | (2006.01) | |
| C22C 38/02 | (2006.01) | |
| C22C 38/04 | (2006.01) | |
| G01G 13/00 | (2006.01) | |
| B22F 9/00 | (2006.01) | |
| B61D 7/00 | (2006.01) | |
| C02F 101/20 | (2006.01) | |
| C02F 103/02 | (2006.01) | |
| C02F 103/10 | (2006.01) | |
| C02F 103/16 | (2006.01) | |

(52) U.S. Cl.
CPC .......... *B61D 7/02* (2013.01); *B61D 7/32* (2013.01); *B61D 17/18* (2013.01); *B61K 13/00* (2013.01); *C02F 1/52* (2013.01); *C21B 5/008* (2013.01); *C21B 7/14* (2013.01); *C21B 13/0006* (2013.01); *C21C 5/52* (2013.01); *C21C 5/527* (2013.01); *C21C 7/0006* (2013.01); *C21C 7/0075* (2013.01); *C21C 7/064* (2013.01); *C21C 7/068* (2013.01); *C22C 33/006* (2013.01); *C22C 33/0257* (2013.01); *C22C 33/0264* (2013.01); *C22C 33/0271* (2013.01); *C22C 38/002* (2013.01); *C22C 38/02* (2013.01); *C22C 38/04* (2013.01); *G01G 13/006* (2013.01); *B22F 2009/001* (2013.01); *B22F 2009/0808* (2013.01); *B22F 2301/35* (2013.01); *B22F 2304/15* (2013.01); *B22F 2998/10* (2013.01); *B22F 2999/00* (2013.01); *B61D 7/00* (2013.01); *C02F 2101/20* (2013.01); *C02F 2101/203* (2013.01); *C02F 2103/023* (2013.01); *C02F 2103/10* (2013.01); *C02F 2103/16* (2013.01); *C02F 2209/40* (2013.01); *C02F 2301/02* (2013.01); *Y10T 428/2982* (2015.01)

(58) Field of Classification Search
CPC ........ B22F 2009/001; B22F 2009/0808; B22F 2998/10; C22C 38/002; C22C 38/02; C22C 38/04; C22C 33/006; C22C 33/0271; C22C 33/0264; C22C 33/0257; Y10T 428/2982; B22D 41/12; B61D 7/02; B61D 7/32; B61D 7/00; B61D 17/18; B61K 13/00; C02F 1/52; C02F 2103/16; C02F 2103/023; C02F 2301/02; C02F 2101/20; C02F 2101/023; C02F 2101/10; C02F 2209/40; C21B 7/14; C21B 13/0006; C21B 5/008; C21C 5/52; C21C 5/527; C21C 7/0006; C21C 7/0075; C21C 7/064; C21C 7/068; G01G 13/006

See application file for complete search history.

(56) References Cited

U.S. PATENT DOCUMENTS

| | | | |
|---|---|---|---|
| 3,548,919 | A | 12/1970 | Gyongyos et al. |
| 3,720,404 | A | 3/1973 | Carleton et al. |
| 3,810,542 | A | 5/1974 | Gloster et al. |
| 3,888,956 | A | 6/1975 | Klint |
| 3,898,037 | A | 8/1975 | Lange et al. |
| 3,923,935 | A | 12/1975 | Cates |
| 4,139,369 | A | 2/1979 | Kandler et al. |
| 4,153,965 | A | 5/1979 | Merly |
| 4,294,784 | A | 10/1981 | Mailund |
| 4,330,511 | A | 5/1982 | Nelson et al. |
| 4,402,884 | A | 9/1983 | Koike et al. |
| 4,416,707 | A | 11/1983 | Foster et al. |
| 4,546,907 | A | 10/1985 | Kemble |
| 4,694,886 | A | 9/1987 | Sakaguchi |
| 4,786,322 | A | 11/1988 | Green |
| 4,893,568 | A | 1/1990 | Adams |
| 5,017,218 | A | 5/1991 | Lundström et al. |
| 5,084,093 | A | 1/1992 | Yamaoka et al. |
| 5,458,671 | A | 10/1995 | Butler et al. |
| 5,552,058 | A | 9/1996 | Fanning |
| 5,673,779 | A | 10/1997 | Spickelmire |
| 6,041,906 | A | 3/2000 | Howard |
| 6,287,362 | B1 | 9/2001 | Levey et al. |
| 8,646,700 | B2 | 2/2014 | Lundström et al. |
| 9,840,746 | B2 | 12/2017 | Lundström |
| 10,486,234 | B2 | 11/2019 | Lundström |
| 10,618,112 | B2 | 4/2020 | Lundström |
| 2001/0002535 | A1 | 6/2001 | Liebig et al. |
| 2002/0026967 | A1* | 3/2002 | Buenemann, Jr. ...... C22C 33/02 148/513 |
| 2003/0015315 | A1 | 1/2003 | Atsushi et al. |
| 2003/0164062 | A1 | 9/2003 | Lundstrom et al. |
| 2005/0133192 | A1 | 6/2005 | Meszaros et al. |
| 2009/0015028 | A1 | 1/2009 | Zamorano |
| 2009/0171512 | A1 | 7/2009 | Duncan |
| 2013/0180360 | A1 | 7/2013 | Kim et al. |
| 2015/0330725 | A1 | 11/2015 | Gurney |
| 2020/0122237 | A1 | 4/2020 | Kemper et al. |

FOREIGN PATENT DOCUMENTS

| | | | |
|---|---|---|---|
| CN | 102700957 | A | 10/2012 |
| CN | 103661440 | B | 1/2016 |
| CN | 205496553 | U | 8/2016 |
| CN | 107385135 | A | 11/2017 |
| CN | 207205279 | U | 4/2018 |
| CN | 212049627 | U | 12/2020 |
| CN | 112305944 | A | 2/2021 |
| CN | 113549715 | A | 10/2021 |
| CN | 214470214 | U | 10/2021 |
| CN | 113828788 | A | 12/2021 |
| CN | 114433854 | A | 5/2022 |
| CN | 216709283 | U | 6/2022 |
| CN | 115417184 | A | 12/2022 |
| CN | 115889716 | A | 4/2023 |
| CN | 116550982 | A | 8/2023 |
| GB | 1287510 | A | 8/1972 |
| JP | H02236212 | A | 9/1990 |
| JP | H06212212 | A | 8/1994 |
| JP | 2001107118 | A | 4/2001 |
| JP | 2002282866 | A | 10/2002 |
| JP | 2005154847 | A | 6/2005 |
| JP | 2020164992 | A | 10/2020 |
| JP | 7033949 | B2 | 3/2022 |
| JP | 2022149432 | A | 10/2022 |
| KR | 20010111750 | A | 12/2001 |
| KR | 100370611 | B1 | 2/2003 |
| KR | 100847667 | B1 | 7/2008 |
| KR | 101086315 | B1 | 11/2011 |
| KR | 101091977 | B1 | 12/2011 |
| KR | 20130076110 | A | 7/2013 |
| KR | 20140102742 | A | 8/2014 |
| KR | 20140120631 | A | 10/2014 |
| KR | 20160034000 | A | 3/2016 |

(56) References Cited

FOREIGN PATENT DOCUMENTS

| | | |
|---|---|---|
| KR | 101649584 B1 | 8/2016 |
| KR | 20230028951 A | 3/2023 |
| WO | 2007105039 A2 | 9/2007 |

OTHER PUBLICATIONS

U.S. Appl. No. 18/882,116, filed Sep. 11, 2024, titled Railcars for Transporting Granulated Metallic Units, and Associated Systems, Devices and Methods.

U.S. Appl. No. 18/882,045, filed Sep. 11, 2024, titled Loading Granulated Metallic Units Into Railcars, and Associated Systems, Devices and Methods.

U.S. Appl. No. 18/882,191, filed Sep. 11, 2024, titled Low-Sulfur Granulated Metallic Units, and Associated Systems, Devices and Methods.

U.S. Appl. No. 18/882,638, filed Sep. 11, 2024, titled Continuous Granulated Metallic Units Production, and Associated Systems, Devices, and Methods.

U.S. Appl. No. 18/882,661, filed Sep. 11, 2024, titled Use of a Basic Oxygen Furnace To Produce Granulated Metallic Units, and Associated Systems, Devices, and Methods.

U.S. Appl. No. 18/882,531, filed Sep. 11, 2024, titled Torpedo Cars for Use With Granulated Metallic Unit Production, and Associated Systems, Devices, and Methods.

U.S. Appl. No. 18/882,384, filed Sep. 11, 2024, titled Treating Cooling Water in Iron Production Facilities, and Associated Systems, Devices, and Methods.

U.S. Appl. No. 18/882,465, filed Sep. 11, 2024, titled Use of Residual Iron Within Granulated Metallic Unit Production Facilities, and Associated Systems, Devices, and Methods.

U.S. Appl. No. 18/882,501, filed Sep. 11, 2024, titled Processing Granulated Metallic Units Within Electric Arc Furnaces, and Associated Systems and Methods.

"Granulation of Hot Metal," by 360 Editor, Apr. 23, 2018, 4 pages.

Beskow et al., "Industrial and High-Capacity Production of Granulated Pig Iron," Association for Iron & Steel Technology, AISTech, May 6-9, 2019, pp. 485-493.

Beskow et al., "World's First High-capacity Granshot© Iron Granulation in Operation at SSAB Oxelosund," AISTech 2009 Proceedings—vol. I, pp. 211-218.

Dupon et al., "Granshot Iron Granulation for Optimized Plant Logistics," METEC InSteelCon Jun. 27-Jul. 1, 2011, Düsseldorf, Germany; 7 pages.

Granulated Pig Iron (GPI), International Iron Metallics Association, accessed Sep. 17, 2024 from https://www.metallics.org/gpi.html; 4 pages.

Industrial and High Capacity Granulation of Pig Iron, Data Sheet, Uvån Hagfors Teknologi AB, Jun. 2019, 4 pages.

Love et al., "Energy Recovery in Granshot© —Process," KTH Industrial Engineering and Management, Stockholm, Sweden, Nov. 25, 2008, 70 pages.

Lundstrom et al., "Pig Iron Granulation at Iscor Saldanha Steel," AISTech 2004 Proceedings—vol. I, pp. 517-524.

Lundstrom, P. "Iron Granulation in Integrated Steel Plants," Nordic Steel & Mining Review 2006, pp. 16-17.

Polanco et al., "Granulation Methods for Metals and Ferroalloys," pp. 401-410. In: 72nd ABM Annual Congress, São Paulo, 2017.

Vesterberg et al., "Granulated metal product from direct tapped furnace—experience from operation at BEFESA Sweden," ATS-JSI Conference, Dec. 17-18, 2012, Paris, France, 2 pages.

International Search Report and Written Opinion for International Application No. PCT/US2024/046276; Date of Mailing: Dec. 20, 2024; 10 pages.

Italimpianti Orafi, "Atomized metal powder: the revolution of the precious metals market," Online article, May 20, 2021; 2 pages.

\* cited by examiner

LOW-CARBON GRANULATED METALLIC UNITS

CROSS-REFERENCE TO RELATED APPLICATIONS

The present application claims the benefit of U.S. Provisional Patent Application No. 63/581,946, filed Sep. 11, 2023, and titled "SYSTEM AND METHOD FOR CONTINUOUS GRANULATED PIG IRON (GPI) PRODUCTION," the disclosure of which is incorporated herein by reference in its entirety. The present application is related to the following applications, the disclosures of which are incorporated herein by reference in their entireties: U.S. patent application Ser. No. 18/882,116, filed Sep. 11, 2024, and titled "RAILCARS FOR TRANSPORTING GRANULATED METALLIC UNITS, AND ASSOCIATED SYSTEMS, DEVICES, AND METHODS"; U.S. patent application Ser. No. 18/882,045, filed Sep. 11, 2024, and titled "LOADING GRANULATED METALLIC UNITS INTO RAILCARS, AND ASSOCIATED SYSTEMS, DEVICES, AND METHODS"; U.S. patent application Ser. No. 18/882,191, filed Sep. 11, 2024, and titled "LOW-SULFUR GRANULATED METALLIC UNITS, AND ASSOCIATED SYSTEMS, DEVICES, AND METHODS"; U.S. patent application Ser. No. 18/882,638, filed Sep. 11, 2024, and titled "CONTINUOUS GRANULATED METALLIC UNITS PRODUCTION, AND ASSOCIATED SYSTEMS, DEVICES, AND METHODS"; U.S. patent application Ser. No. 18/882,661, filed Sep. 11, 2024, and titled "USE OF A BASIC OXYGEN FURNACE TO PRODUCE GRANULATED METALLIC UNITS, AND ASSOCIATED SYSTEMS, DEVICES, AND METHODS"; U.S. patent application Ser. No. 18/882,631, filed Sep. 11, 2024, and titled "TORPEDO CARS FOR USE WITH GRANULATED METALLIC UNIT PRODUCTION, AND ASSOCIATED SYSTEMS, DEVICES, AND METHODS"; U.S. patent application Ser. No. 18/882,384, filed Sep. 11, 2024, and titled "TREATING COOLING WATER IN IRON PRODUCTION FACILITIES, AND ASSOCIATED SYSTEMS, DEVICES, AND METHODS"; U.S. patent application Ser. No. 18/882,465, filed Sep. 11, 2024, and titled "USE OF RESIDUAL IRON WITHIN GRANULATED METALLIC UNIT PRODUCTION FACILITIES, AND ASSOCIATED SYSTEMS, DEVICES, AND METHODS"; U.S. patent application Ser. No. 18/882,501, filed Sep. 11, 2024, and titled "PROCESSING GRANULATED METALLIC UNITS WITHIN ELECTRIC ARC FURNACES, AND ASSOCIATED SYSTEMS AND METHODS".

TECHNICAL FIELD

This disclosure relates to low-carbon granulated metallic units, and associated systems, devices, and methods.

BACKGROUND

Granulated pig iron (GPI) is a form of pig iron that is granulated into small, uniform particles, making it easier to handle, transport, and use in different metallurgical processes compared to conventional pig iron. The demand for GPI has been steadily increasing due to its versatile applications in various industries, including automotive, construction, and manufacturing. The growing popularity of GPI can be attributed to its high purity, consistent quality, and the efficiency it brings to the production of steel and other iron-based products.

Granulated pig iron is produced by rapidly cooling molten pig iron with water, resulting in the formation of granules. This process, known as granulation, is typically carried out after blast furnaces. However, current production methods are often characterized by intermittent production cycles due to various operational constraints, such as the need for periodic maintenance, fluctuations in raw material supply, and energy consumption issues. These interruptions not only affect the overall efficiency but also lead to increased production costs and variability in product quality. Therefore, there is a need for an improved production process that can ensure continuous and stable granulation of pig iron, thereby enhancing productivity and reducing operational costs.

BRIEF DESCRIPTION OF THE DRAWINGS

Features, aspects, and advantages of the presently disclosed technology can be better understood about the following drawings.

Figure 1:
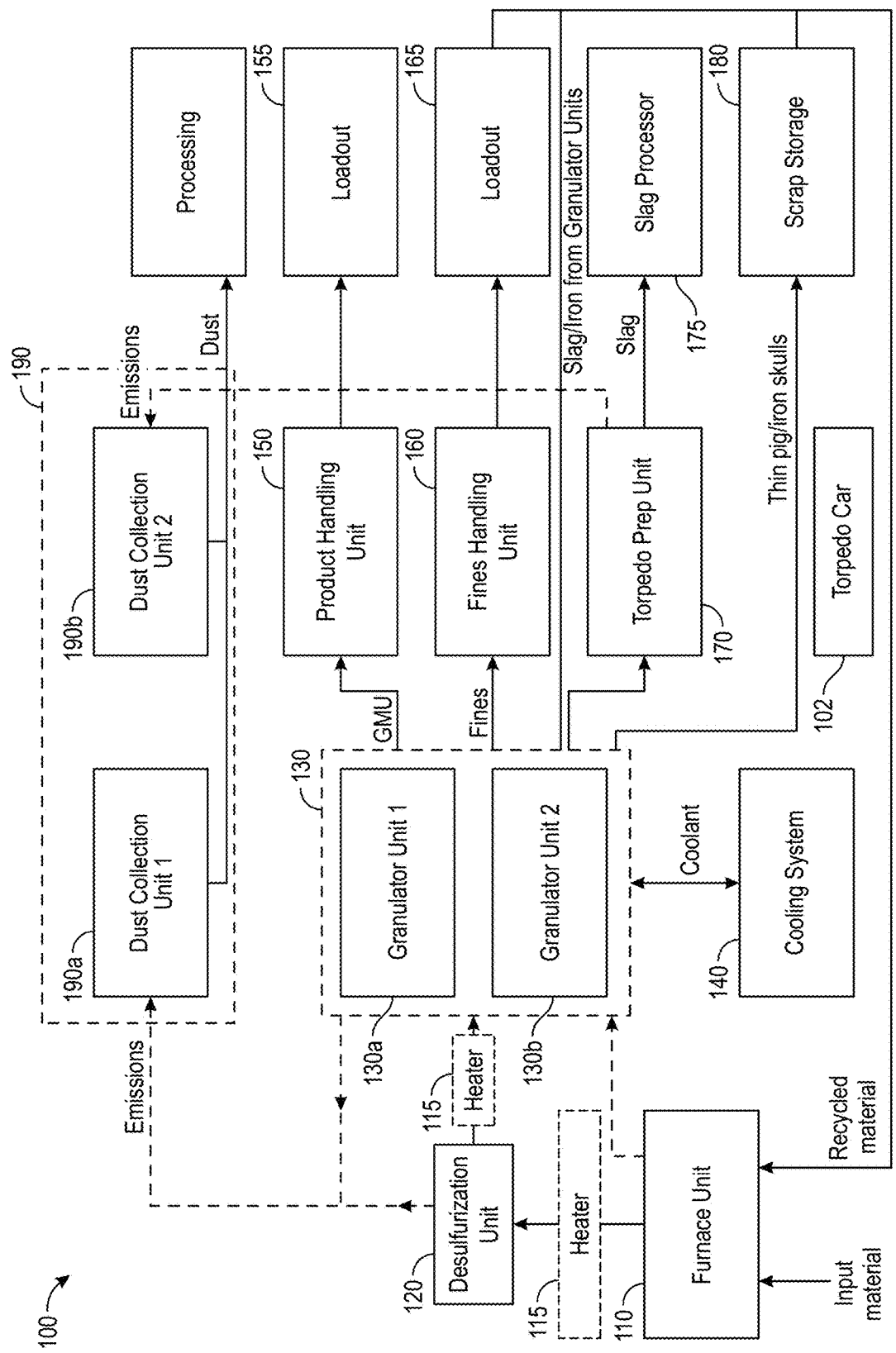
FIG. 1 is a schematic block diagram of a continuous granulated metallic unit production system configured in accordance with embodiments of the present technology.

A person skilled in the relevant art will understand that the features shown in the drawings are for purposes of illustrations, and variations, including different or additional features and arrangements thereof, are possible.

DETAILED DESCRIPTION

I. Overview

The present technology is generally directed to low-carbon granulated metallic units (GMUs) and associated systems, devices, and methods. The low-carbon GMUs (i.e., a plurality of particles) can be a low-carbon granulated iron (GI) and/or GPI. GMUs can be processed using one or more metal processing systems (e.g., Electric Arc Furnaces (EAFs), Basic Oxygen Furnaces (BOFs), Ladle Metallurgy Furnaces (LMFs), etc.) to create various final metal products (e.g., steel, cast iron, specialty alloys, etc.). Impurities such as sulfur, phosphorus, and silicon in the granulated iron can negatively affect the quality and properties of the final metal products resulting from the processing of the granulated iron, as well as limit the processing ability of these systems. For example, phosphorus, silicon, and sulfur reduce ductility and toughness, cause brittleness, and lead to surface defects and weldability issues in final metal products. These impurities also contribute to the formation of non-metallic inclusions and excessive slag, complicating metal processing and compromising the quality of final metal products. Furthermore, sulfur accelerates the wear and erosion of metal processing equipment, such as the refractory linings of furnace shells, thereby increasing maintenance and decreasing the lifetime of processing equipment. Current metal processing methods require the removal of impurities through the addition of desulfurizing agents, basic fluxes, and deoxidizing agents, which form compounds that are captured in slag and separated from the molten metal product. However, removing impurities (e.g., via desulfurization) increases the cost and decreases the efficiency of processing, making the use of low-sulfur and low-impurity GMU advantageous.

Similarly, current processes adjust carbon content to achieve the desired final metal product compositions and properties. For example, the decarburization process involves blowing oxygen or other gases through the molten metal to lower its carbon content. This process can be performed in an EAF, BOF, LMF, and/or other metal processing systems. However, decarburization is time-consuming and costly, making the use of carbon-tuned granulated iron advantageous for adjusting the carbon content of the final metal product. Additionally, the decarburization process results in significant carbon dioxide emissions, negatively impacting the environment.

Embodiments of the present technology address at least some of these issues by producing a low-carbon GMUs, with individual GMUs comprising, e.g., a mass fraction of carbon between 0.1 weight percent (wt. %) and 4.0 wt. %. As described herein, the low-carbon GMU can an comprise a mass fraction of phosphorous of at least 0.025 wt. %, a mass fraction of silicon between 0.25 wt. % and 1.5 wt. %, a mass fraction of manganese of at least 0.2 wt. %, a mass fraction of sulfur of at least 0.008 wt. %, and/or a mass fraction of iron of at least 94.0 wt. %. In some embodiments, the low-carbon GMU can have a particle size distribution that balances melting efficiency, charge density, dust generation, and slag formation. For example, in some embodiments, at least 50% of particles in the granulated iron have a particle size of at least 6 millimeters (mm). The GMU of the present technology enables the production of high-quality metal products with better cost-effectiveness because a similar or better-quality final metal product can be produced without any additional impurity removals (e.g., desulfurization, decarbonization, etc.).

As another example, embodiments of the present technology include granulated iron with different ranges of sulfur and carbon that can be used to make final metal products with a desired sulfur and/or carbon concentration without the need for sulfur and/or carbon removal. The present technology provides consistent quality and improves melting efficiency, resulting in an efficient and lower-cost granulated iron that can be used in various metal processing processes to produce higher quality metal products with better mechanical properties and lower energy consumption. Additional benefits of embodiments of the present technology are described elsewhere herein.

The GMU production system is designed for continuous operation. Relative to non-continuous GPI production systems, embodiments of the present technology enhance energy efficiency and reduces emissions by minimizing the need for frequent shutdowns and restarts, which are often associated with excessive venting and/or less efficient operations. As described herein, some embodiments include (i) a desulfurization unit that lowers the sulfur content in molten metal, thereby reducing sulfur dioxide ($SO_2$) emissions, (ii) dust collection units that filter out particulate matter, thereby reducing air pollution, (iii) infrastructure to recycle fines, slag, iron skulls and other residual iron/previously-processed iron, thereby reducing the environmental impact associated with raw material extraction and conserving natural resources, and/or (iv) water management and cooling systems that minimize heat losses, enhance thermal efficiency of production processes, and optimize water consumption. Overall, the continuous GMU production system enhances productivity while minimizing greenhouse gas emissions and waste, contributing to more sustainable industrial practices and helping mitigate climate change.

Relatedly, conventional iron production has a significant environmental impact due to its high energy consumption and emissions of pollutants. As such, embodiments of the present technology which relate to GMU production systems can reduce this impact. Sulfur, phosphorus, and silicon in GPI negatively affect the quality and properties of final metal products, leading to issues like reduced ductility, toughness, and weldability, as well as surface defects and brittleness. These impurities also contribute to the formation of non-metallic inclusions and excessive slag, complicating metal processing and compromising product quality. Sulfur, in particular, accelerates the wear and erosion of metal processing equipment, increasing maintenance costs and decreasing equipment lifespan. Embodiments of the present technology include methods for removing these impurities in part can improve the quality and durability of final metal products and enhances the efficiency and lifespan of processing equipment, leading to cost savings and more sustainable production practices.

In the Figures, identical reference numbers identify generally similar, and/or identical, elements. Many of the details, dimensions, and other features shown in the Figures are merely illustrative of particular embodiments of the disclosed technology. Accordingly, other embodiments can have other details, dimensions, and features without departing from the spirit or scope of the disclosure. In addition, those of ordinary skill in the art will appreciate that further embodiments of the various disclosed technologies can be practiced without several of the details described below.

II. Embodiments of a Continuous Granulated Metallic Unit Production System

FIG. 1 is a schematic block diagram of a continuous GMU production system 100 ("the system 100") configured in accordance with embodiments of the present technology. As explained elsewhere herein, GMUs can include granulated iron (GI), granulated pig iron (GPI), granulated steel (GS), or GMU. Relatedly, molten metal can include molten pig iron or molten steel. As used herein, the term "continuous" should be interpreted to mean continuous operations cycles, including in batch or semi-batch operations, for at least 4 hours, 6 hours, 8 hours, 10 hours, 12 hours, 16 hours, 20 hours, or 24 hours. The system 100 can include a furnace unit 110, a desulfurization unit 120, granulator units 130 including a first granulator unit 130a and a second granulator unit 130b, and a cooling system 140. The furnace unit 110 can receive input materials (e.g., iron ore, coke, limestone, and/or preheated air) and/or recycled material, which can be sourced from downstream components of the system 100 as described in further detail herein. Equations (1)-(6) below detail some of the chemical processes controlled at the furnace unit.

$$C + O_2 \rightarrow CO_2 \qquad (1)$$

$$CO_2 + C \rightarrow 2CO \qquad (2)$$

$$Fe_2O_3 + 3CO \rightarrow 2Fe + 3CO_2 \qquad (3)$$

$$Fe_2O_3 + 3C \rightarrow 2Fe + 3CO \qquad (4)$$

$$CaCO_3 \rightarrow CaO + CO_2 \qquad (5)$$

$$CaO + SiO_2 \rightarrow CaSiO_3 \qquad (6)$$

Equation (1) represents the combustion of coke, which is a form of carbon. When coke reacts with oxygen gas introduced into the furnace (e.g., via an oxygen lance), it forms carbon dioxide. This exothermic reaction releases a significant amount of heat, which is essential for maintaining the high temperatures required for subsequent reactions. The carbon dioxide produced via Equation (1) further reacts with additional coke to form carbon monoxide, as illustrated by Equation (2). This endothermic reaction helps to moderate the temperature within the furnace unit 110. Equations (3) and (4) represent the reduction of iron ore ($Fe_2O_3$). As illustrated by Equation (3), the iron oxide reacts with the carbon monoxide produced via Equation (2), which acts as a reducing agent to convert iron ore into iron and produces carbon dioxide as a byproduct. Alternatively, as illustrated by Equation (4), the iron ore may be reduced directly by the coke, albeit less commonly. Equations (5) and (6) represent the formation of slag. As illustrated by Equation (5), the calcium carbonate/limestone ($CaCO_3$) can decompose into calcium oxide and carbon dioxide at the high temperatures of the furnace unit 110. As illustrated by Equation (6), the calcium oxide can then react with silica ($SiO_2$), an impurity in the iron ore, to form calcium silicate ($CaSiO_3$), also known as slag. The furnace unit 110 can output molten iron (from Equations (3) and (4)) and slag (from Equations (5) and (6)).

In some embodiments, the input materials (e.g., the coke, the iron ore, and/or the limestone) include sulfur, which can remain in the molten iron output by the furnace unit 110. A torpedo car 102 or other transfer vessel can transfer the molten iron from the furnace unit 110 to the desulfurization unit 120. The desulfurization unit 120 can include equipment to reduce the sulfur content of the molten iron. For example, one or more lances can be used to deliver magnesium (Mg), calcium carbide ($CaC_2$), or other sulfur-reducing agent to the molten iron. In some embodiments, the molten iron is desulfurized while remaining inside the torpedo car 102. Equations (7) and (8) below detail the reactions between the sulfur and the sulfur-reducing agents.

$$Mg + S \rightarrow MgS \quad (7)$$

$$CaC_2 + S \rightarrow CaS + 2C \quad (8)$$

The resulting substances, including magnesium sulfide (MgS) and calcium sulfide (CaS), are not soluble in molten iron and will therefore be in solid form (e.g., as solid particles) that can be more readily removed at the desulfurization unit 120 and/or further downstream. As discussed further herein, reducing the sulfur content can increase the quality of the GMU product and/or allow the production process to be continuous. After the desulfurization process, the torpedo car 102 can transfer the molten iron from the desulfurization unit 120 to the granulator units 130. In some embodiments, as indicated by the dashed arrow, the desulfurization unit 120 is bypassed and the molten iron is transferred directly from the furnace unit 110 to the granulator units 130. Notably, conventional facilities may not include a desulfurization unit or may otherwise lack the ability to desulfurize molten iron. One reason for this is that conventional steelmaking facilities directly feed molten iron from blast furnaces to basic oxygen furnaces, and opt to granulate the molten iron only when the basic oxygen furnaces are down. Because producing GPI is a backup operation for such facilities, the added complexity and costs associated with establishing desulfurization equipment may not be economical.

In some embodiments, the temperature of the molten iron is within a predetermined range prior to reaching the granulator units 130. For example, maintaining the molten iron in a sufficiently fluid state can better ensure the formation of uniform granules and help avoid premature solidification, which can lead to irregular granule shapes and sizes. In some embodiments, the system includes one or more heaters 115 before and/or after the desulfurization unit 120, e.g., to reheat the molten iron within the torpedo car 102. For example, if the temperature of the molten iron is below a threshold temperature value, the heater 115 can be used to raise the temperature of the molten iron in the torpedo car 102 to be within a desired temperature range. The threshold temperature value can vary between different compositions, and can be between 2300-2500° F., between 2300-2400° F., or between 2340-2350° F. In some embodiments, the heater 115 comprises one or more oxygen lances.

The torpedo car 102 can transfer the molten iron to one of the granulator units 130. While FIG. 1 illustrates two granulator units 130, it will be understood that the system 100 can include one, three, four, five, six, or more granulator units 130. The granulator units 130 can each include a granulation reactor that receives and granulates molten iron to form granulated products. For example, the granulation reactor can include a cavity that holds water, and the molten iron can be transferred (e.g., poured, sprayed) onto a target of the reactor holding the water. The water can be maintained at a sufficiently low temperature by the cooling system 140 (e.g., cooled directly by pumping the water between the granulator units 130 and the cooling system 140, cooled indirectly by pumping a coolant separate from the water that receives the molten iron). In some embodiments, the granulator units 130 each includes one or more components for controlling the flow of molten iron from the torpedo car 102 to the granulation reactor. As one of ordinary skill in the art will appreciate, flow control can affect the shape, size, and quality of the granulated products. The granulator units 130 can also include a dewatering assembly for drying the granulated products from the granulation reactor to output GMU. The granulator units 130 can further include a classifier assembly for filtering the filtrate from the dewatering assembly to output fines.

The system 100 can further include a product handing unit 150 to receive the GMU output by the granulator units 130 (e.g., by the dewatering assembly), and a loadout 155 downstream of the product handling unit 150. Additionally, the system 100 can further include a fines handling unit 160 to receive the fines output by the granulator units 130 (e.g., by the classifier assembly), and a loadout 165 downstream of the fines handling unit 160. In some embodiments, the product handling unit 150 and/or the fines handling unit 160 each includes one or more conveyor belts, diverters, stockpile locations, etc. The system 100 can additionally include a torpedo preparation unit 170 that can remove slag and/or kish from the torpedo car 102. For example, the torpedo car 102, after delivering the molten iron to the granulator units 130, can proceed to the torpedo prep unit 170 to be cleaned or otherwise prepared for the next cycle of transferring molten iron. The removed slag can be subsequently transferred to a slag processor 175. The system 100 can further include a scrap storage 180 that can receive thin pig and/or iron skulls from the granulator units 130.

As shown in FIG. 1, the fines at the loadout 165, slag and/or iron from the granulator units 130, and/or the thin pig and/or iron skulls at the scrap storage 180 can be fed back into the furnace unit 110 as recycled materials. In some embodiments, the recycled materials are processed (e.g., pelletized) prior to being fed into the furnace unit 110. Furthermore, emissions from various components of the system 100 can be collected and directed towards a dust collection unit 190 (e.g., a baghouse, a scrubber, etc.). In FIG. 1, for example, the emissions from the desulfurization unit 120 and the granulator units 130 are directed to a first dust collection unit 190a, and the emissions from the torpedo prep unit 170 are directed to a second dust collection unit 190b. Each of the dust collection units 190 can filter the emissions to remove dust therefrom so that clean waste gas is sent to stacks (not shown) to be released into the atmosphere, and the removed dust can be directed to further processing.

Figure 2:
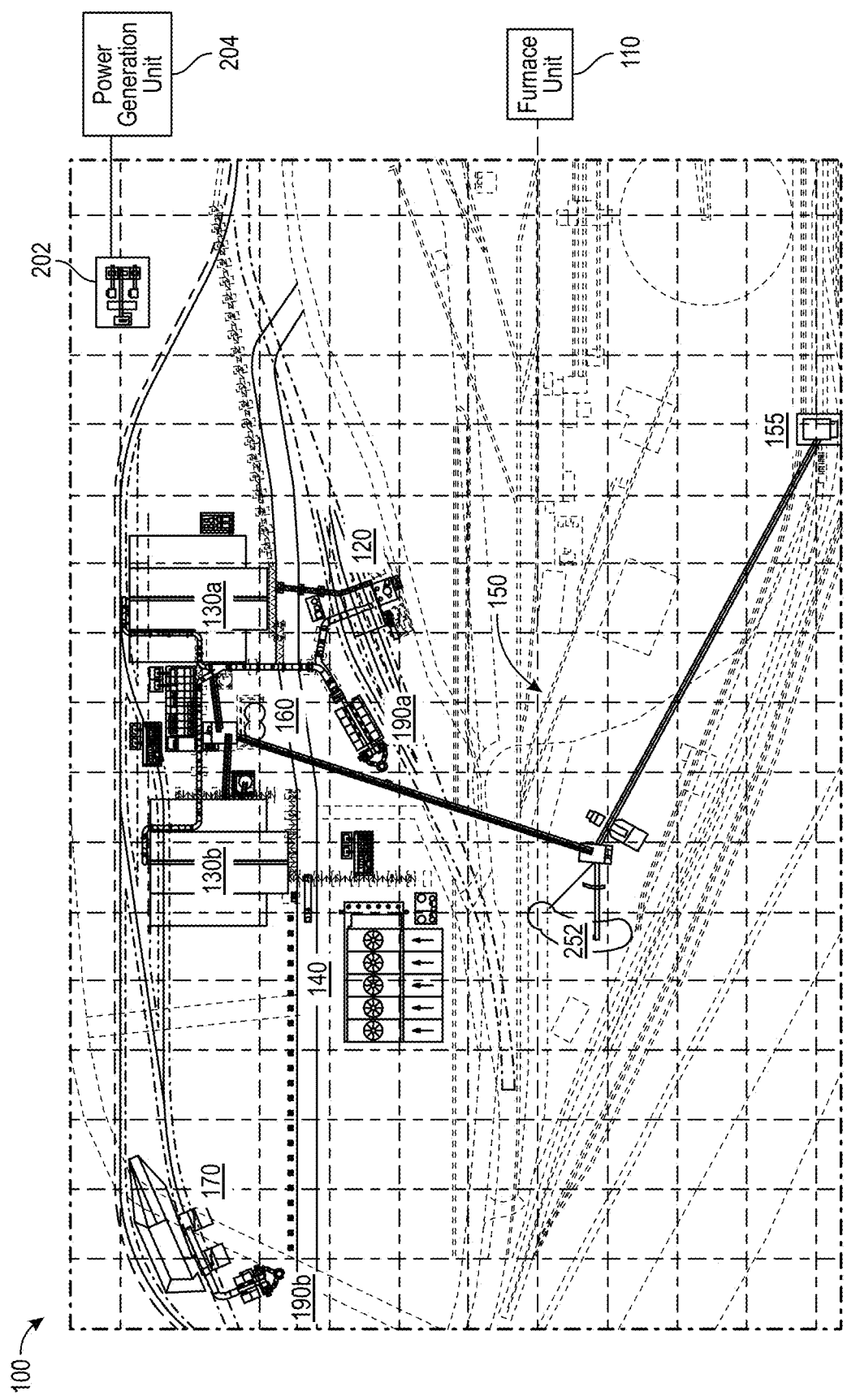
FIG. 2 is a plan view of the continuous granulated metallic unit production system of FIG. 1, configured in accordance with embodiments of the present technology.

FIG. 2 is a plan view of the continuous GMU production system 100. It will be appreciated that the plan view illustrated in FIG. 2 is merely one example, and that the components of the system 100 can be arranged differently in other embodiments. As shown, the system 100 can further include an electrical building 202 and a power generation unit 204 for providing electrical power to the system 100. As discussed further herein, one or more of the components of the system 100 can be powered electrically as opposed to, e.g., hydraulically. The furnace unit 110 can be located away from many of the other components of the system 100. The torpedo car 102 or other transfer vessel (not shown) can transfer the molten iron from the furnace unit 110 to the desulfurization unit 120 along tracks illustrated in dashed lines.

Figure 3:
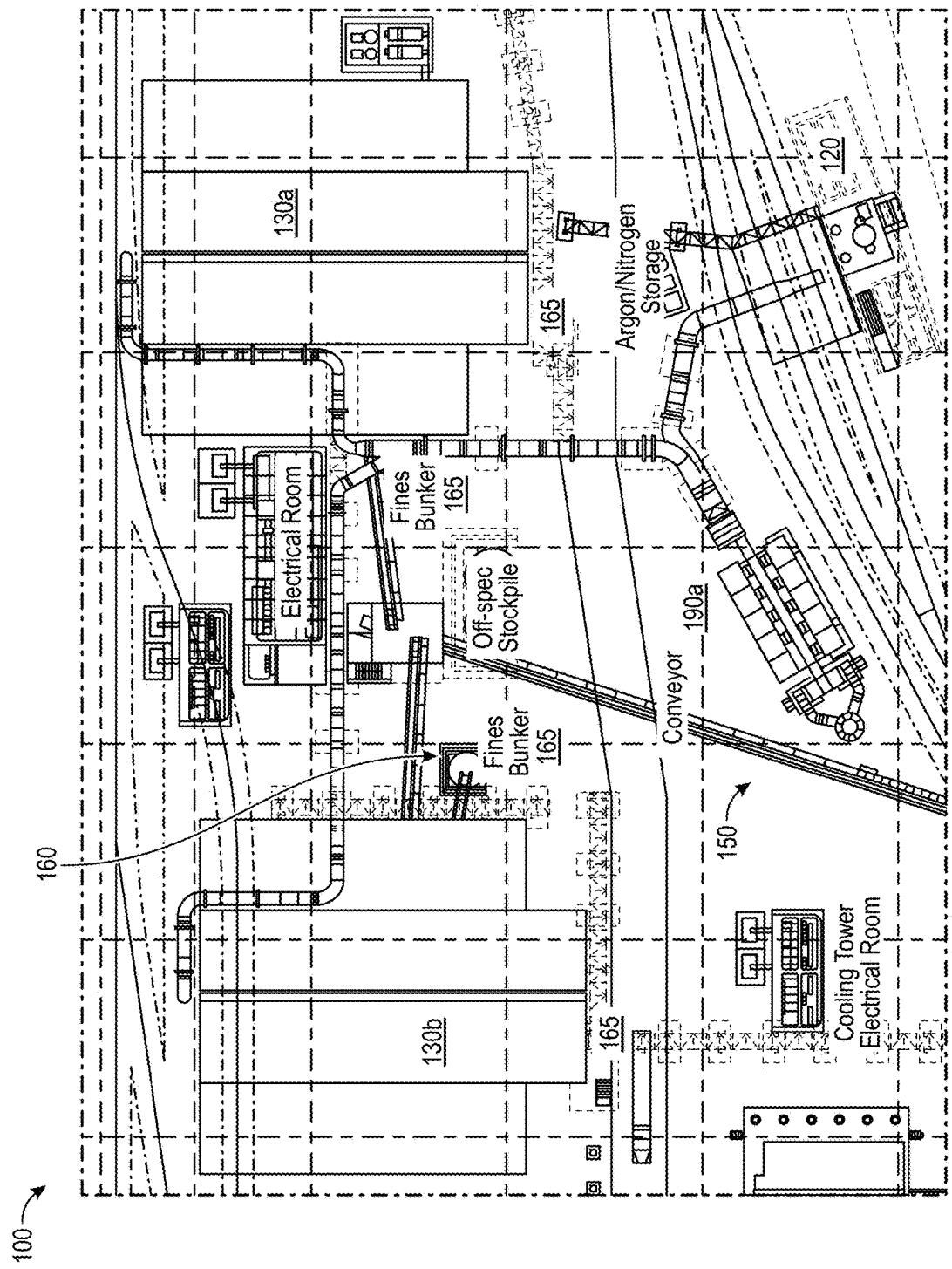
FIG. 3 is an enlarged view of the continuous granulated metallic unit production system of FIG. 2.

Referring momentarily to FIG. 3, which is an enlarged plan view of the system 200, the desulfurization unit 120 can desulfurize the molten iron while the molten iron remains in the torpedo car 102. Once the molten iron is desulfurized, the torpedo car 102 can continue along the tracks to the granulator units 130. The torpedo car 102 can deliver the molten iron to either of the first granulator unit 130a or the second granulator unit 130b depending on, e.g., the availability of each of the granulator units 130. The GMU produced by each of the granulator units 130 can be transferred downstream via one or more conveyor belts that form part of the product handling unit 150. The fines produced by each of the granulator units 130 can be transferred to fines bunkers located adjacent to the granulator units 130 and ultimately sent to the loadout(s) 165. As shown in FIG. 3, the first dust collection unit 190a can be connected to each of the desulfurization unit 120 and the granulator units 130 via pipes to collect emissions therefrom.

Returning to FIG. 2, the cooling system 140 can be located adjacent to the granulator units 130 to provide cooling thereto as needed. The product handling unit 150 can include a stockpile area 252 for storing GMU products. One or more conveyor belts can extend between each of the granulator units 130 and the stockpile area 252, and between the stockpile area 252 and the loadout 155. In some embodiments, the loadout 155 comprises a building at which a desired quantity of GMUs can be measured and transferred to a railcar or other transfer vehicle. In some embodiments, the GMUs is subsequently transferred to an electric arc furnace (not shown) for steel production. The torpedo car 102, after delivering the molten iron to the granulator units 130, can continue along the tracks to reach the torpedo prep unit 170. As discussed above with reference to FIG. 1, the torpedo prep unit 170 can facilitate removal of slag and/or kish from the torpedo car 102. The second dust collection unit 190b can be connected to the torpedo prep unit 170 via pipes to collect emissions therefrom.

Referring to FIGS. 1-3 together, the system 100 is expected to be able to continuously produce GMU, unlike conventional GMU production systems. First, the inclusion of the desulfurization unit 120 provides several advantages. For example, GMUs with lower sulfur content produces less slag when melted at an electric arc furnace downstream, saving associated time, costs, and energy consumption. The use of GMUs with lower sulfur content can also ease maintaining the desired chemical composition and temperature, reducing the frequency of adjustments and interruptions during the melting cycle. Lower sulfur levels can also result in less wear and tear on other components of the system, reducing maintenance needs and associated downtime.

Second, the inclusion of a plurality of granulator units 130 allows molten iron to be granulated at separate granulator units in parallel. The granulator units 130 can also serve as backups for one another in case one of the granulator units 130 is down (e.g., due to malfunctioning components, maintenance, etc.). Furthermore, in some embodiments, the various components of the granulator units 130 are modular. For example, each of the components can be easily and independently removed (e.g., for maintenance) and/or replaced (e.g., via an overhead crane) without impacting operation of the other components.

Figure 4:
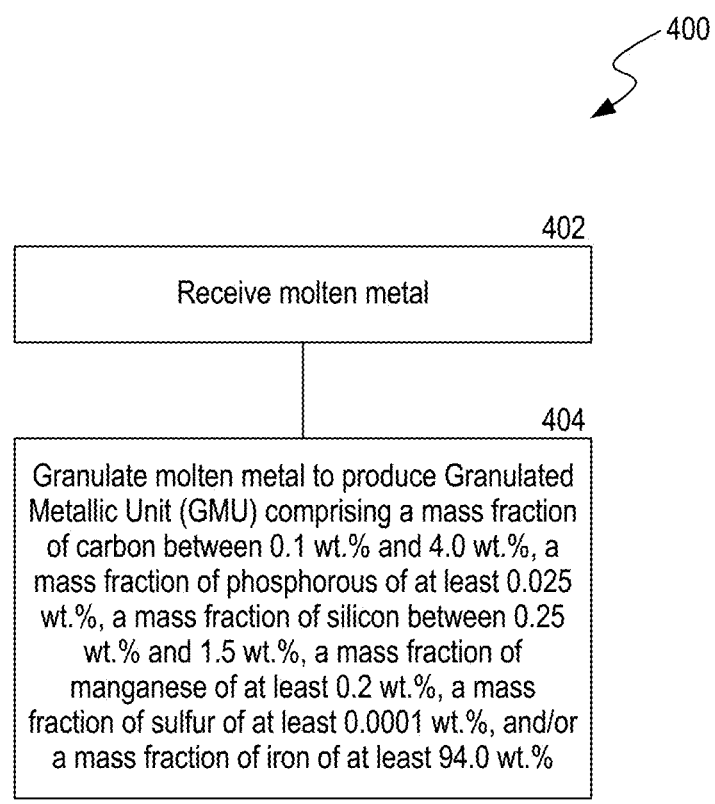
FIG. 4 is a flow diagram of a method for producing a granulated metallic unit, in accordance with embodiments of the present technology.

III. Low-Carbon Granulated Metallic Units (GMUs), and Associated Systems, Devices, and Methods FIG. 4 is a flow diagram of a method 400 for producing a GMU, in accordance with embodiments of the present technology. The method can include receiving a molten metal (process portion 402). For example, the molten metal can be molten iron, pig iron, and/or any other molten metal described in more detail with reference to FIGS. 1-3.

The method 400 can further include granulating the molten metal to produce the GMU comprising a mass fraction of carbon between 0.1 wt. % and 4.0 wt. %, a mass fraction of phosphorous of at least 0.025 wt. %, a mass fraction of silicon between 0.25 wt. % and 1.5 wt. %, a mass fraction of manganese of at least 0.2 wt. %, a mass fraction of sulfur of at least 0.008 wt. %, and/or a mass fraction of iron of at least 94.0 wt. % (process portion 404). For example, a granulator can granulate the molten metal to produce the GMU, as described in more detail with reference to FIGS. 1-3. In some embodiments, the GMU can be produced at a production rate of at least 250, 500, 750, 1000, 1250, 1500, 1750, or 2000 tons per day, within a range of 250 and 2000 tons per day, or any value therebetween (e.g., 253.5 tons per day, 1001 tons per day, etc.). The production process, including input materials, production rates, systems, devices, etc., is described in more detail with reference to FIGS. 1-3.

In some embodiments, the GMU comprises a mass fraction of sulfur that is at most 0.08 wt %, 0.04 wt %, 0.02 wt %, 0.01 wt %, 0.008 wt %, 0.006 wt %, 0.004 wt %, 0.002 wt %, 0.001 wt %, 0.0008 wt %, 0.0006 wt %, 0.0004 wt %, 0.0002 wt %, or 0.0001 wt %, within a range of 0.0001 wt. % and 0.08 wt. %, 0.0001 wt. % and 0.01 wt. %, 0.0001 wt. % and 0.01 wt. %, 0.0001 wt. % and 0.008 wt. %, 0.0001 wt. % and 0.001 wt. %, or 0.0001 wt. % and 0.0008 wt. %, or any value therebetween (e.g., 0.0013 wt %, 0.024 wt %, 0.0005 wt. % and 0.08 wt. %, etc.). Lower sulfur content in the GMU can be advantageous since higher sulfur content can lead to issues during the metal processing process, such as when processing the GMU in an EAF to make steel. For example, high sulfur content can increase the slag produced during metal processing, leading to equipment corrosion in the metal processing system (e.g., the EAF, LMF, etc.) and difficulty in controlling the chemical composition of the final metal product. As an additional example, high sulfur content can increase the processing time in the LMF. This discrepancy means that the processing time in the EAF does not generally match the time spent in the LMF, thereby decreasing production efficiency due to the holdup before the EAF. Furthermore, higher sulfur content can result in higher sulfur emissions, contributing to air pollution and acid rain, which have negative environmental effects. In some embodiments, the GMU is a Granulated Pig Iron (GPI). Higher sulfur content in the GPI can lead to the formation of iron sulfide (FeS) during the metal processing process. This can create weak spots in the final metal product, such as steel, making it more brittle and prone to cracking.

In some embodiments, the GMU comprises a mass fraction of carbon that is at most 0.1 wt. %, 0.5 wt. %, 1.0 wt. %, 1.5 wt. %, 2.0 wt. %, 2.5 wt. %, 3.0 wt. %, 3.5 wt. %, or 4.0 wt. %, within a range of 0.1 wt. % and 4.0 wt. %, or any value therebetween. Additionally or alternatively, the GMU can comprise a mass fraction of carbon that is at most 0.1 wt. %, 0.25 wt. %, 0.5 wt. %, 0.75 wt. %, or 1.0 wt. %, within a range of 0.1 wt. % to 1.0 wt. %, or any value therebetween. In some embodiments, the GMU comprises a mass fraction of carbon that is below a liquid-to-solid equilibrium carbon level for a molten metal used to produce the GMU (e.g., a molten metal from a blast furnace). Additionally or alternatively, the GMU can comprise a mass fraction of carbon that is below a eutectic point or equilibrium for the GMU. The eutectic point can be, for example, a composition and/or a temperature at which the GMU melts, or the molten metal solidifies, forming a unique microstructure, as described in more detail with relation to bulk density, melting point temperature, and/or cooling temperature herein. If the GMU comprises a mass fraction of carbon within a range of 0.1% and 1.0% or any value therebetween, the GMU can be a GS. The GS can be used with metal processing systems such as the EAF, BOF, or LMF, and/or in foundries to produce final metal products such as steel. The GS can be desirable in steel production because it is generally more consistent in composition and more energy efficient than alternative inputs. For example, GS can be used in an EAF as an alternative iron unit with generally lower levels of carbon, allowing decarbonization processes to be omitted and increasing overall production efficiency. Additionally, the GS can improve the quality and control of the final steel product.

In some embodiments, lower carbon content in the GMU increases throughput in the metal processing process. For example, lower carbon content can reduce the time spent removing excess carbon (e.g., decarburization), allowing for generally faster metal processing. Lower carbon content also decreases slag formation in processing equipment (e.g., EAF, BOF, LMF, etc.), which minimizes interruptions for slag removal, allowing for more efficient metal processing, reduced wear and tear on equipment, and fewer maintenance interruptions. Furthermore, lower carbon content in the GMUs generally results in lower carbon dioxide emissions during the metal processing process, reducing negative environmental effects. Additionally, lower carbon content enables the GMUs to be used as alternative iron units that generally do not hinder steel production in the EAF and produce higher quality steel.

The GMU can comprise a mass fraction of carbon within a range of 0.01 wt. % and 4.0 wt. % or any value therebetween, allowing the total carbon content in the metal processing process to be tunable using the GMU. For example, the GMU can be mixed with one or more additional carbon sources (e.g., low-quality iron or other materials) in the metal processing process to achieve the desired final product composition and quality while increasing efficiency of production. In some embodiments, using the GMU with other lower-quality carbon sources can result in an overall higher-quality final metal product. Additionally or alternatively, the GMU can be used to dilute contaminants (e.g., copper, tin, lead, zinc, nickel, chromium, molybdenum, etc.) in different metal sources and/or metal processing equipment.

The GMU can comprise (i) a mass fraction of phosphorus of at most 0.025 wt. %, 0.04 wt. %, 0.055 wt. %, 0.07 wt. %, or 0.085 wt. %, within a range of 0.025 wt. % and 0.085 wt. %, or any value therebetween, (ii) a mass fraction of silicon of at most 0.25 wt. %, 0.5 wt. %, 1.0 wt. %, 1.25 wt. %, or 1.5 wt. %, within a range of 0.25 wt. % and 1.5 wt. %, or any value therebetween, and/or (iii) a mass fraction of manganese of at most 0.2 wt. %, 0.25 wt. %, 0.3 wt. %, 0.35 wt. %, or 0.4 wt. %, within a range of 0.2 wt. % and 0.4 wt. %, or any value therebetween. Lower levels of impurities (e.g., sulfur, silicon, phosphorus, manganese, etc.) in the GMU can enhance the mechanical properties, corrosion resistance, weldability, and/or machinability of the GMU, while also reducing environmental impact and production costs in the metal processing process. Furthermore, the lower levels of impurities can result in the GMU having generally higher iron content. In some embodiments, the GMU comprises a mass fraction of iron that is at least 94.0 wt. %, 94.5 wt. %, 95.0 wt. %, 95.5 wt. %, or 96.0 wt. %, within a range of 94.0 wt. % and 96.0 wt. %, or any value therebetween. It can be advantageous to have generally higher iron content in metal processing that requires high levels of iron in the final metal product (e.g., cast iron, steel, etc.).

The composition of the GMU can affect properties such as melting point and bulk density. For example, lower levels of impurities, such as sulfur, silicon, phosphorous, manganese, etc., can lower the melting point of the GMU. Similarly, various levels of carbon in the GMU, amongst other factors, can adjust the melting point. For example, as the carbon content of the GMU decreased, the melting point of the GMU increases. In some embodiments, the GMU can have a melting point of at least 1100° C., 1150° C., 1200° C., 1250° C., 1300° C., 1350° C., 1400° C., 1450° C., or 1500° C., within a range of 1100° C. and 1450° C. or any value therebetween. For example, (i) a GMU having a carbon content between 2.0 wt % and 4.0 wt % can have a melting point between 1125° C. and 1175° C., (ii) a GMU having a carbon content between 1.75 wt % and 2.25 wt % can have a melting point between 1150° C. and 1200° C., (iii) a GMU having a carbon content between 1.25 wt % and 1.75 wt % can have a melting point between 1225° C. and 1375° C., and (iv) a GMU having a carbon content between 0.75 wt % and 1.25 wt % can have a melting point between 1325° C. and 1475° C. In some embodiments, the GMU has a freezing temperature of at least 1090° C., at least 1200° C., at least 1210° C., or at least 1220° C., or within a range of 1090° C. to 1230° C. In some embodiments, lower levels of impurities and/or lower levels of carbon will increase the melting point of the GMU. As a result, the molten metal received will be at a generally higher temperature, and more cooling is generally used to produce the GMU. Additionally, lower levels of impurities such as sulfur, silicon, phosphorus, and manganese can increase the bulk density of the GMUs, as impurities can create voids or weaken the metal structure, resulting in a less dense material. Lower carbon content can also increase the bulk density of the GMU, whereas higher carbon content generally reduces bulk density because carbon atoms are less dense than iron atoms and can create a more porous microstructure. Therefore, higher levels of iron can also increase the bulk density of the GMU. In some embodiments, the GMU has a bulk density of at least 250, 315, 380, 445, or 500 pounds per cubic foot, within a range of 250 and 500 pounds per cubic foot, or any value therebetween. The melting point and/or bulk density of the GMU can be tuned based on the metal processing process to be used and/or the desired properties of the final metal product. In some embodiments, the GMUs have a specific gravity of no more than 5.0, 5.5, 6.0, or 6.5, within a range of 5.0 to 6.5, or any value therebetween. In some embodiments, a plurality of GMUs have an angle of repose no more than 30, no more than 35, no more than 40, no more than 45, or no more than 50, within a range of 35 to 50, 40 to 50 or 45 to 50, or any value therebetween. In some embodiments, a plurality of GMUs have a uniform particle shape corresponding to an oval or round shape. For example, no more than 40%, 35%, 30%, 25%, 20%, or 15% of a plurality of GMUs have a non-round or non-oval shape or "J-hooks".

Figure 5:
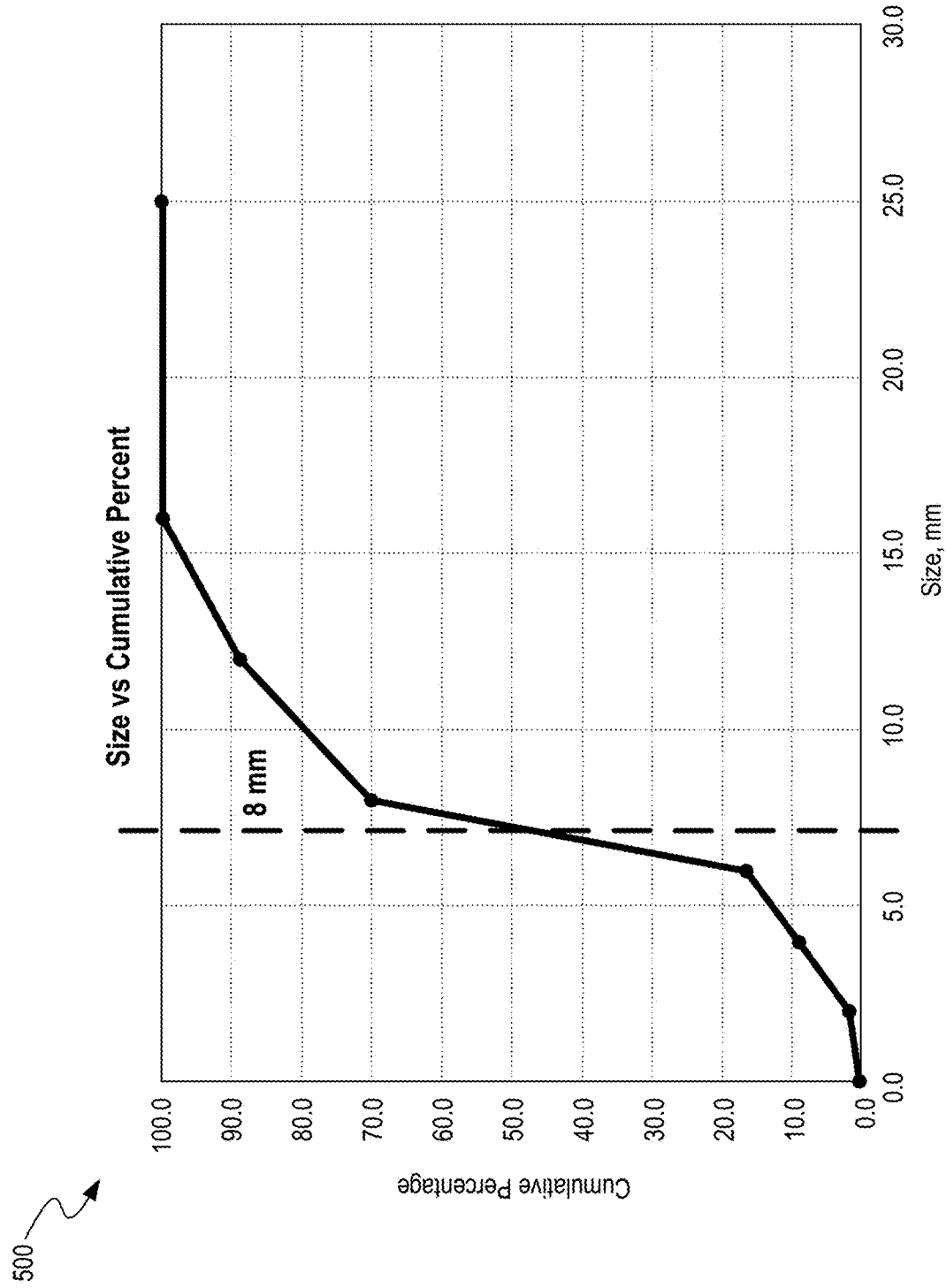
FIG. 5 is a chart depicting Particle Size of vs. Cumulative Percentage of granulated metallic units, in accordance with embodiments of the present technology.

FIG. 5 is a chart 500 depicting Particle Size vs. Cumulative Percentage of GMUs, in accordance with embodiments of the present technology. The chart 500 includes a line corresponding to a particle size of 8 mm. As shown in the chart 500, the GMU reaches a cumulative weight percentage of 50% at a particle size of 8 mm. In some embodiments, the GMU can have a size distribution such that at least 50 wt. % of the GMU is at least 5 mm, 6 mm, 8 mm, 10 mm, 12 mm, 14 mm, or 16 mm, within a range of 8 mm and 16 mm, or any value therebetween. Additionally or alternatively, the GMU can have a size distribution such that at most 2.5 wt. % of the GMU is less than 1 mm, 2 mm, 3 mm, 4 mm, 5 mm, or 6 mm, within a range of 1 mm and 6 mm, or any value therebetween. In some embodiments, it is advantageous for the GMU to have a consistent particle size distribution, with at least 50 wt. % of the GMU having a particle size between 8 mm and 16 mm. Particle size consistency of the GMU can increase the permeability and uniformity in metal processing systems such as EAFs, BOFs, LMFs, and/or different furnaces. This can lead to more efficient melting and chemical reactions in creating the final metal product. Additionally, limiting the weight percentage of particles smaller than 4 mm reduces the risk of dust generation and material loss, thereby improving overall process efficiency and product quality.

In some embodiments, the GMU can have a size distribution broken down in size ranges by wt. % as depicted in Table 1 below. As shown in Table 1, the GMU can have a size distribution such that at most 0.41 wt. % of the GMU is less than 2 mm, at most 1.31 wt. % of the GMU is within a range of 2 mm and 4 mm, at most 7.24 wt. % of the GMU is within a range of 4 mm and 6 mm, and/or at most 7.53 wt. % of the GMU is within a range of 6 mm and 8 mm. Additionally or alternatively, the GMU can have a size distribution such that at least 53.46 wt. % of the GMU is within a range of 8 mm and 12 mm, at least 18.79 wt. % of the GMU is within a range of 12 mm and 16 mm, at least 10.92 wt. % of the GMU is within a range of 16 mm and 25 mm, and/or at least 0.07 wt. % of the GMU is more than 25 mm. It is worth noting that although these example wt. % and size distributions are provided, the wt. % of the size distributions can each vary by +/−10 wt. %.

TABLE 1

GMU Size Distribution

| mm | wt. % | mm | wt. % sum |
|---|---|---|---|
| >25 mm | 0.07 | 25 | 99.73 |
| 16-25 mm | 10.92 | 16 | 99.66 |
| 12-16 mm | 18.79 | 12 | 88.74 |
| 8-12 mm | 53.46 | 8 | 69.95 |
| 6-8 mm | 7.53 | 6 | 16.49 |
| 4-6 mm | 7.24 | 4 | 8.96 |
| 2-4 mm | 1.31 | 2 | 1.72 |
| <2 mm | 0.41 | 0 | 0.41 |

As further shown in Table 1, the size distribution of the GMU can be broken down by cumulative weight percentage or "wt. % sum". For example, 0.41 wt. % sum of the GMU is within a range 0 mm and 2 mm, 1.72 wt. % sum of the GMU is within a range of 0 mm and 4 mm, 8.96 wt. % sum of the GMU is within a range of 0 mm and 6 mm, 16.49 wt. % sum of the GMU is within a range of 0 mm and 8 mm, 69.95 wt. % sum of the GMU is within a range of 0 mm and 12 mm, 88.74 wt. % sum of the GMU is within a range of 0 mm and 16 mm, 99.66 wt. % sum of the GMU is within a range of 0 mm and 25 mm, and 99.73 wt. % sum of the GMU is within a range of 0 and over 25 mm. The wt. % sum can similarly vary by +/−10 wt. % sum, depending on the wt. % and size distributions, as described above. In some embodiments, a plurality of GMUs have an average particle size of at least 6 mm, at least 9 mm, or at least 11 mm, within a range of 6 mm to 25 mm, 9 mm to 25 mm, 11 mm to 25 mm, 14 mm to 25 mm, or any value therebetween.

The size distributions can affect the use of the GMU in the metal processing process. In some embodiments, maintaining a higher proportion of mid-sized particles (e.g., between 8 mm and 16 mm) facilitates better heat transfer and uniform distribution within the metal processing systems, optimizing energy consumption during processing. The controlled size distribution can also minimize the occurrence of blockages and/or uneven flow in the processing system, lowering the number of interruptions throughout processing. The GMU can also allow manufacturers to achieve a more consistent and high-quality output, reducing the need for reprocessing and enhancing the quality of the final metal product.

From the foregoing, it will be appreciated that, although specific embodiments of the technology have been described herein for purposes of illustration, various modifications can be made without deviating from the spirit and scope of the technology. Further, certain aspects of the new technology described in the context of particular embodiments can be combined or eliminated in other embodiments. Moreover, while advantages associated with certain embodiments of the technology have been described in the context of those embodiments, other embodiments can also exhibit such advantages, and not all embodiments need necessarily exhibit such advantages to fall within the scope of the technology. Accordingly, the disclosure and associated technology can encompass other embodiments not expressly shown or described herein. Thus, the disclosure is not limited except as by the appended claims.

IV. Conclusion

It will be apparent to those having skill in the art that changes may be made to the details of the above-described embodiments without departing from the underlying principles of the present disclosure. In some cases, well known structures and functions have not been shown or described in detail to avoid unnecessarily obscuring the description of the embodiments of the present technology. Although steps of methods may be presented herein in a particular order, alternative embodiments may perform the steps in a different order. Similarly, certain aspects of the present technology disclosed in the context of particular embodiments can be combined or eliminated in other embodiments. Furthermore, while advantages associated with certain embodiments of the present technology may have been disclosed in the context of those embodiments, other embodiments can also exhibit such advantages, and not all embodiments need necessarily exhibit such advantages or other advantages disclosed herein to fall within the scope of the technology. Accordingly, the disclosure and associated technology can encompass other embodiments not expressly shown or described herein, and the invention is not limited except as by the appended claims.

Throughout this disclosure, the singular terms "a," "an," and "the" include plural referents unless the context clearly indicates otherwise. Additionally, the term "comprising," "including," and "having" should be interpreted to mean including at least the recited feature(s) such that any greater number of the same feature and/or additional types of other features are not precluded.

Reference herein to "one embodiment," "an embodiment," "some embodiments" or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments.

Unless otherwise indicated, all numbers expressing numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present technology. At the very least, and not as an attempt to limit the application of the doctrine of equivalents to the scope of the claims, each numerical parameter should at least be construed in light of the number of reported significant digits and by applying ordinary rounding techniques. Additionally, all ranges disclosed herein are to be understood to encompass any and all subranges subsumed therein. For example, a range of "1 to 10" includes any and all subranges between (and including) the minimum value of 1 and the maximum value of 10, i.e., any and all subranges having a minimum value of equal to or greater than 1 and a maximum value of equal to or less than 10, e.g., 5.5 to 10. All ranges defined by the term "between" are inclusive of the endpoint values of the ranges. For example, a range "between 1 and 10" includes the minimum value of 1, the maximum value of 10, and any values therein between.

The disclosure set forth above is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims. As used herein, the term "and/or," as in "A and/or B" refers to A alone, B alone, or both A and B.

The present technology is illustrated, for example, according to various aspects described below as numbered clauses (1, 2, 3, etc.) for convenience. These are provided as examples and do not limit the present technology. It is noted that any of the dependent clauses may be combined in any combination, and placed into a respective independent clause. The other clauses can be presented in a similar manner.

1. A plurality of Granulated Metallic Unit (GMUs), individual GMUs comprising:
   a mass fraction of phosphorous of at least 0.025 wt. %;
   a mass fraction of silicon between 0.25 wt. % and 1.5 wt. %;
   a mass fraction of manganese of at least 0.2 wt. %;
   a mass fraction of carbon between 0.1 wt. % and 4.0 wt. %;
   a mass fraction of sulfur of at least 0.0001 wt. %; and
   a mass fraction of iron of at least 94.0 wt. %,
   wherein the GMU has a size distribution such that at least 50 wt. % of the GMU is at least 6 millimeters.
2. The plurality of GMUs of any one of the clauses herein, wherein the mass fraction of carbon is at most 0.1 wt. %, 1.0 wt. %, 2.0 wt. %, 3.0 wt. %, or 4.0 wt. %.
3. The plurality of GMUs of any one of the clauses herein, wherein the mass fraction of carbon is between 0.1 wt. % and 3.0 wt. %.
4. The plurality of GMUs of any one of the clauses herein, wherein the mass fraction of carbon is at most 0.1 wt. %, 0.8 wt. %, 1.5 wt. %, 2.2 wt. %, or 3.0 wt. %.
5. The plurality of GMUs of any one of the clauses herein, wherein the mass fraction of carbon is between 0.1 wt. % and 2.0 wt. %.
6. The plurality of GMUs of any one of the clauses herein, wherein the mass fraction of carbon is at most 0.1 wt. %, 0.5 wt. %, 1.0 wt. %, 1.5 wt. %, or 2.0 wt. %.
7. The plurality of GMUs of any one of the clauses herein, wherein the mass fraction of carbon is between 0.1 wt. % and 1.0 wt. % and the GMU is a Granulated Steel (GS).
8. The plurality of GMUs of any one of the clauses herein, wherein the mass fraction of carbon is at most 0.1 wt. %, 0.25 wt. %, 0.5 wt. %, 0.75 wt. %, or 1.0 wt. % and the GMU is a Granulated Steel (GS).
9. The plurality of GMUs of any one of the clauses herein, wherein the mass fraction of sulfur is between 0.0001 wt. % and 0.08 wt. %.
10. The plurality of GMUs of any one of the clauses herein, wherein the mass fraction of sulfur is at most 0.08 wt. %, 0.04 wt. %, 0.02 wt. %, 0.01 wt. %, 0.008 wt. %, 0.006 wt. %, 0.004 wt. %, 0.002 wt. %, 0.001 wt. %, 0.0008 wt. %, 0.0006 wt. %, 0.0004 wt. %, 0.0002 wt. %, or 0.0001 wt. %.
11. The plurality of GMUs of any one of the clauses herein, wherein the mass fraction of sulfur is between 0.0001 wt. % and 0.05 wt. %.
12. The plurality of GMUs of any one of the clauses herein, wherein the mass fraction of sulfur is at most 0.05 wt. %, 0.03 wt. %, 0.01 wt. %, 0.008 wt. %, 0.005 wt. %, 0.003 wt. %, 0.001 wt. %, 0.0005 wt. %, 0.0003 wt. %, or 0.0001 wt. %.
13. The plurality of GMUs of any one of the clauses herein, wherein the mass fraction of sulfur is between 0.0001 wt. % and 0.02 wt. %.
14. The plurality of GMUs of any one of the clauses herein, wherein the mass fraction of sulfur is at most 0.002 wt. %, 0.001 wt. %, 0.0008 wt. %, 0.0006 wt. %, 0.0004 wt. %, 0.0002 wt. %, or 0.0001 wt. %.
15. The plurality of GMUs of any one of the clauses herein, wherein the mass fraction of sulfur is between 0.0001 wt. % and 0.01 wt. %.
16. The plurality of GMUs of any one of the clauses herein, wherein the mass fraction of sulfur is at most 0.01 wt. %, 0.008 wt. %, 0.006 wt. %, 0.004 wt. %, 0.002 wt. %, 0.001 wt. %, 0.0008 wt. %, 0.0006 wt. %, 0.0004 wt. %, 0.0002 wt. %, or 0.0001 wt. %.
17. The plurality of GMUs of any one of the clauses herein, wherein the mass fraction of carbon is between 0.1 wt. % and 4.0 wt. % and the mass fraction of sulfur is between 0.0001 wt. % and 0.08 wt. %.
18. The plurality of GMUs of any one of the clauses herein, wherein the mass fraction of carbon is between 0.1 wt. % and 2.0 wt. % and the mass fraction of sulfur is between 0.0001 wt. % and 0.05 wt. %.
19. The plurality of GMUs of any one of the clauses herein, wherein the mass fraction of carbon is between 0.1 wt. % and 1.0 wt. %, the mass fraction of sulfur is between 0.0001 wt. % and 0.02 wt. %, and the GMU is a Granulated Steel (GS).
20. The plurality of GMUs of any one of the clauses herein, wherein the GMU is Granulated Pig Iron (GPI).
21. The plurality of GMUs of any one of the clauses herein, wherein the mass fraction of phosphorous is between 0.025 wt. % and 0.085 wt. %.
22. The plurality of GMUs of any one of the clauses herein, wherein the mass fraction of phosphorous is at most 0.025 wt. %, 0.04 wt. %, 0.055 wt. %, 0.07 wt. %, or 0.085 wt. %.
23. The plurality of GMUs of any one of the clauses herein, wherein the mass fraction of phosphorous is between 0.025 wt. % and 0.045 wt. %.
24. The plurality of GMUs of any one of the clauses herein, wherein the mass fraction of phosphorous is at most 0.025 wt. %, 0.03 wt. %, 0.035 wt. %, 0.04 wt. %, or 0.045 wt. %.
25. The plurality of GMUs of any one of the clauses herein, wherein the mass fraction of silicon is at most 0.25 wt. %, 0.5 wt. %, 1.0 wt. %, 1.25 wt. %, or 1.5 wt. %.
26. The plurality of GMUs of any one of the clauses herein, wherein the mass fraction of silicon is between 0.25 wt. % and 0.75 wt. %.
27. The plurality of GMUs of any one of the clauses herein, wherein the mass fraction of silicon is at most 0.25 wt. %, 0.35 wt. %, 0.45 wt. %, 0.55 wt. %, 0.65 wt. %, or 0.75 wt. %.
28. The plurality of GMUs of any one of the clauses herein, wherein the mass fraction of manganese is between 0.2 wt. % and 0.4 wt. %.
29. The plurality of GMUs of any one of the clauses herein, wherein the mass fraction of manganese is at most 0.2 wt. %, 0.25 wt. %, 0.3 wt. %, 0.35 wt. %, or 0.4 wt. %.
30. The plurality of GMUs of any one of the clauses herein, wherein the mass fraction of manganese is between 0.2 wt. % and 0.3 wt. %.
31. The plurality of GMUs of any one of the clauses herein, wherein the mass fraction of manganese is at most 0.2 wt. %, 0.23 wt. %, 0.25 wt. %, 0.28 wt. %, or 0.3 wt. %.
32. The plurality of GMUs of any one of the clauses herein, wherein the mass fraction of iron is between 94.0 wt. % and 96.0 wt. %.
33. The plurality of GMUs of any one of the clauses herein, wherein the mass fraction of iron is at least 94.0 wt. %, 94.5 wt. %, 95.0 wt. %, 95.5 wt. %, or 96.0 wt. %.
34. The plurality of GMUs of any one of the clauses herein, wherein the mass fraction of iron is between 95.0 wt. % and 96.0 wt. %.
35. The plurality of GMUs of any one of the clauses herein, wherein the mass fraction of iron is at least 95.0 wt. %, 95.25 wt. %, 95.5 wt. %, 95.75 wt. %, or 96.0 wt. %.
36. The plurality of GMUs of any one of the clauses herein, wherein the size distribution is such that at least 30 wt. %, 40 wt. %, 50 wt. %, or 60 wt. % of the GMU is at least 6, 8, 10, 12, 14, or 16 millimeters.
37. The plurality of GMUs of any one of the clauses herein, wherein the size distribution is such that at least 50 wt. % of the GMU is between 6 and 12 millimeters.
38. The plurality of GMUs of any one of the clauses herein, wherein the size distribution is such that at least 30 wt. %, 40 wt. %, 50 wt. %, or 60 wt. % of the GMU is at least 6, 7, 8, 9, 10, 11, or 12 millimeters.
39. The plurality of GMUs of any one of the clauses herein, wherein the size distribution is such that at least 50 wt. % of the GMU is between 6 and 10 millimeters.
40. The plurality of GMUs of any one of the clauses herein, wherein the size distribution is such that at least 30 wt. %, 40 wt. %, 50 wt. %, or 60 wt. % of the GMU is at least 6, 6.5, 7, 7.5, 8, 8.5, 9, 9.5, or 10 millimeters.
41. The plurality of GMUs of any one of the clauses herein, wherein the size distribution is such that at most 2.5 wt. % of the GMU is less than 4 millimeters.
42. The plurality of GMUs of any one of the clauses herein, wherein the size distribution is such that at most 1 wt. %, 2.5 wt. %, 5 wt. %, 7.5 wt. %, or 10 wt. % of the GMU is less than 1, 2, 3, 4, 5, or 6 millimeters.
43. The plurality of GMUs of any one of the clauses herein, wherein the size distribution is such that:
at most 0.41 wt. % of the GMU is less than 2 millimeters;
at most 1.31 wt. % of the GMU is between 2 and 4 millimeters;
at most 7.24 wt. % of the GMU is between 4 and 6 millimeters;
at most 7.53 wt. % of the GMU is between 6 and 8 millimeters;
at least 53.46 wt. % of the GMU is between 8 and 12 millimeters;
at least 18.79 wt. % of the GMU is between 12 and 16 millimeters;
at least 10.92 wt. % of the GMU is between 16 and 25 millimeters; and
at least 0.07 wt. % of the GMU is more than 25 millimeters.
44. The plurality of GMUs of any one of the clauses herein, further comprising a bulk density between 250 and 500 pounds per cubic foot.
45. The plurality of GMUs of any one of the clauses herein, further comprising a bulk density at least 250, 315, 380, 445, or 500 pounds per cubic foot.
46. The plurality of GMUs of any one of the clauses herein, further comprising a melting point between 1000° C. and 1250° C.
47. The plurality of GMUs of any one of the clauses herein, further comprising a melting point of at least 1100° C., 1150° C., 1200° C., 1250° C., 1300° C., 1350° C., 1400° C., 1450° C., or 1500° C.

48. The plurality of GMUs of any one of the clauses herein, wherein the GMU is produced at a production rate of at least 250, 500, 750, or 1000 tons per day.
49. The plurality of GMUs of any one of the clauses herein, wherein the GMU is produced at a production rate of at least 1000 tons per day.
50. The plurality of GMUs of any one of the clauses herein, wherein the GMU is produced at a production rate of at least 1000, 1250, 1500, 1750, or 2000 tons per day.
51. The plurality of GMUs of any one of the clauses herein, wherein a plurality of the GMUs have an average particle size of at least 6, 9, or 11 millimeters.
52. The plurality of GMUs of any one of the clauses herein, wherein a plurality of the GMUs have an angle of repose no more than 30, 35, 40, 45, or 50.
53. The plurality of GMUs of any one of the clauses herein, wherein no more than 30%, 25%, 20%, or 15% of a plurality of the GMUs have a non-round or non-oval shape.
54. The plurality of GMUs of any one of the clauses herein, wherein a plurality of the GMUs have a specific gravity of no more than 5.0, 5.5, 6.0, or 6.5.
55. The plurality of GMUs of any one of the clauses herein, wherein the GMU has a freezing temperature of at least 1090° C., at least 1200° C., at least 1210° C., or at least 1220° C., or within a range of 1090° C. to 1230° C.
56. A plurality of Granulated Metallic Unit (GMUs), individual GMUs comprising:
a mass fraction of phosphorous of at least 0.025 wt. %;
a mass fraction of silicon between 0.25 wt. % and 1.5 wt. %;
a mass fraction of manganese of at least 0.2 wt. %;
a mass fraction of carbon of 0.1 wt. % and 4.0 wt. %;
a mass fraction of sulfur of at least 0.0001 wt. %; and
a mass fraction of iron of at least 94.0 wt. %.
57. The plurality of GMUs of any one of the clauses herein, wherein the GMU has a size distribution such that at least 50 wt. % of the GMU is at least 6 millimeters.
58. The plurality of GMUs of any one of the clauses herein, wherein the GMU has a size distribution such that at least 50 wt. % of the GMU is between 6 and 12 millimeters.
59. The plurality of GMUs of any one of the clauses herein, wherein the GMU has a size distribution such that at least 50 wt. % of the GMU is between 6 and 10 millimeters.
60. The plurality of GMUs of any one of the clauses herein, wherein the GMU has a size distribution such that at most 2.5 wt. % of the GMU is less than 4 millimeters.
61. The plurality of GMUs of any one of the clauses herein, wherein the GMU has a size distribution such that:
at most 0.41 wt. % of the GMU is less than 2 millimeters;
at most 1.31 wt. % of the GMU is between 2 and 4 millimeters;
at most 7.24 wt. % of the GMU is between 4 and 6 millimeters;
at most 7.53 wt. % of the GMU is between 6 and 8 millimeters;
at least 53.46 wt. % of the GMU is between 8 and 12 millimeters;
at least 18.79 wt. % of the GMU is between 12 and 16 millimeters;
at least 10.92 wt. % of the GMU is between 16 and 25 millimeters; and
at least 0.07 wt. % of the GMU is more than 25 millimeters.
62. A plurality of Granulated Metallic Unit (GMUs), individual GMUs comprising:
a mass fraction of phosphorous of at least 0.025 wt. %;
a mass fraction of silicon between 0.25 wt. % and 1.5 wt. %;
a mass fraction of manganese of at least 0.2 wt. %;
a mass fraction of carbon of 0.1 wt. % and 4.0 wt. %;
a mass fraction of sulfur of at least 0.0001 wt. %; and
a mass fraction of iron of at least 94.0 wt. %,
wherein the GMU has a size distribution such that at most 2.5% of the GMU is less than 4 millimeters.
63. A plurality of Granulated Metallic Unit (GMUs), individual GMUs comprising:
a mass fraction of phosphorous of at least 0.025 wt. %;
a mass fraction of silicon between 0.25 wt. % and 1.5 wt. %;
a mass fraction of manganese of at least 0.2 wt. %;
a mass fraction of carbon of 0.1 wt. % and 4.0 wt. %;
a mass fraction of sulfur of at least 0.0001 wt. %; and
a mass fraction of iron of at least 94.0 wt. %; and
a bulk density between 250 and 500 pounds per cubic foot.
64. A plurality of Granulated Metallic Unit (GMUs), individual GMUs comprising:
a mass fraction of phosphorous of at least 0.025 wt. %;
a mass fraction of silicon between 0.25 wt. % and 1.5 wt. %;
a mass fraction of manganese of at least 0.2 wt. %;
a mass fraction of carbon of 0.1 wt. % and 4.0 wt. %;
a mass fraction of sulfur of at least 0.0001 wt. %; and
a mass fraction of iron of at least 94.0 wt. %; and
a melting point between 1000° C. and 1500° C.
65. A plurality of Granulated Metallic Unit (GMUs), individual GMUs comprising:
a mass fraction of phosphorous of at least 0.025 wt. %;
a mass fraction of silicon between 0.25 wt. % and 1.5 wt. %;
a mass fraction of manganese of at least 0.2 wt. %;
a mass fraction of carbon of 0.1 wt. % and 4.0 wt. %;
a mass fraction of sulfur of at least 0.0001 wt. %; and
a mass fraction of iron of at least 94.0 wt. %,
wherein the GMU is produced at a production rate of at least 1000 tons per day.
66. A method for producing a plurality of Granulated Metallic Unit (GMUs), individual GMUs comprising:
receiving a molten metal; and
granulating the molten metal to produce the GMU comprising:
a mass fraction of phosphorous of at least 0.025 wt. %,
a mass fraction of silicon between 0.25 wt. % and 1.5 wt. %,
a mass fraction of manganese of at least 0.2 wt. %,
a mass fraction of carbon between 0.1 wt. % and 4.0 wt %,
a mass fraction of sulfur of at least 0.0001 wt. %, and
a mass fraction of iron of at least 94.0 wt. %.
67. The method of any one of the clauses herein, wherein the mass fraction of carbon is below a liquid-to-solid equilibrium carbon level of the molten metal received.
68. The method of any of the clauses herein, wherein the mass fraction of carbon is below a eutectic point for the molten metal received.

What is claimed is:

1. A plurality of granulated metallic units, individual granulated metallic units comprising:
- a mass fraction of phosphorous of at least 0.025 wt. %;
- a mass fraction of silicon between 0.25 wt. % and 1.5 wt. %;
- a mass fraction of manganese of at least 0.2 wt. %;
- a mass fraction of carbon between 0.1 wt. % and 4.0 wt. %;
- a mass fraction of sulfur of at least 0.0001 wt. %; and
- a mass fraction of iron of at least 94.0 wt. %,
- wherein the plurality of granulated metallic units has a size distribution such that at least 50 wt. % of the plurality of granulated metallic units is at least 6 millimeters, and
- wherein the plurality of granulated metallic units has a melting point between 1100° C. and 1600° C.

2. The plurality of granulated metallic units of claim 1, wherein the mass fraction of carbon is between 0.1 wt. % and 3.0 wt. %.

3. The plurality of granulated metallic units of claim 1, wherein the mass fraction of carbon is between 0.1 wt. % and 2.0 wt. %.

4. The plurality of granulated metallic units of claim 1, wherein the mass fraction of carbon is between 0.1 wt. % and 1.0 wt. % and the plurality of granulated metallic units is granulated steel.

5. The plurality of granulated metallic units of claim 1, wherein the mass fraction of sulfur is between 0.0001 wt. % and 0.08 wt. %.

6. The plurality of granulated metallic units of claim 1, wherein the mass fraction of carbon is between 0.1 wt. % and 4.0 wt. % and the mass fraction of sulfur is between 0.0001 wt. % and 0.01 wt. %.

7. The plurality of granulated metallic units of claim 1, wherein the plurality of granulated metallic units is a plurality of granulated pig irons.

8. The plurality of granulated metallic units of claim 1, wherein the mass fraction of phosphorous is between 0.025 wt. % and 0.085 wt. %.

9. The plurality of granulated metallic units of claim 1, wherein the mass fraction of silicon is between 0.25 wt. % and 0.75 wt. %.

10. The plurality of granulated metallic units of claim 1, wherein the mass fraction of manganese is between 0.2 wt. % and 0.4 wt. %.

11. The plurality of granulated metallic units of claim 1, wherein the mass fraction of iron is between 94.0 wt. % and 96.0 wt. %.

12. The plurality of granulated metallic units of claim 1, wherein an average particle size of the plurality of granulated metallic units is between 6 and 25 millimeters.

13. The plurality of granulated metallic units of claim 1, wherein the size distribution is such that at least 50 wt. % of the plurality of granulated metallic units is between 6 and 12 millimeters.

14. The plurality of granulated metallic units of claim 1, wherein the size distribution is such that at most 2.5 wt. % of the plurality of granulated metallic units is less than 4 millimeters.

15. The plurality of granulated metallic units of claim 1, wherein the size distribution is such that:
- at most 0.41 wt. % of the plurality of granulated metallic units is less than 2 millimeters;
- at most 1.31 wt. % of the plurality of granulated metallic units is between 2 and 4 millimeters;
- at most 7.24 wt. % of the plurality of granulated metallic units is between 4 and 6 millimeters;
- at most 7.53 wt. % of the plurality of granulated metallic units is between 6 and 8 millimeters;
- at least 53.46 wt. % of the plurality of granulated metallic units is between 8 and 12 millimeters;
- at least 18.79 wt. % of the plurality of granulated metallic units is between 12 and 16 millimeters;
- at least 10.92 wt. % of the plurality of granulated metallic units is between 16 and 25 millimeters; and
- at least 0.07 wt. % of the plurality of granulated metallic units is more than 25 millimeters.

16. The plurality of granulated metallic units of claim 1, wherein a bulk density of the plurality of granulated metallic units is between 250 and 500 pounds per cubic foot.

17. The plurality of granulated metallic units of claim 1, wherein a specific gravity of the plurality of granulated metallic units is between 5.0 and 6.5.

18. The plurality of granulated metallic units of claim 1, wherein the plurality of granulated metallic units is produced at a production rate of at least 1000 tons per day.

19. A plurality of granulated metallic units, individual granulated metallic units comprising:
- a mass fraction of phosphorous of at least 0.025 wt. %;
- a mass fraction of silicon between 0.25 wt. % and 1.5 wt. %;
- a mass fraction of manganese of at least 0.2 wt. %;
- a mass fraction of carbon between 0.1 wt. % and 4.0 wt. %;
- a mass fraction of sulfur of at least 0.0001 wt. %; and
- a mass fraction of iron of at least 94.0 wt. %,
- wherein the plurality of granulated metallic units has a size distribution such that at least 50 wt. % of the plurality of granulated metallic units is at least 6 millimeters, and
- wherein a bulk density of the plurality of granulated metallic units is between 250 and 500 pounds per cubic foot.

20. A plurality of granulated metallic units, individual granulated metallic units comprising:
- a mass fraction of phosphorous of at least 0.025 wt. %;
- a mass fraction of silicon between 0.25 wt. % and 1.5 wt. %;
- a mass fraction of manganese of at least 0.2 wt. %;
- a mass fraction of carbon between 0.1 wt. % and 4.0 wt. %;
- a mass fraction of sulfur of at least 0.0001 wt. %; and
- a mass fraction of iron of at least 94.0 wt. %,
- wherein the plurality of granulated metallic units has a size distribution such that at least 50 wt % of the plurality of granulated metallic units is at least 6 millimeters, and
- wherein a specific gravity of the plurality of granulated metallic units is between 5.0 and 6.5.

* * * * *

UNITED STATES PATENT AND TRADEMARK OFFICE
CERTIFICATE OF CORRECTION

| | | |
|---|---|---|
| PATENT NO. | : 12,420,335 B2 | Page 1 of 1 |
| APPLICATION NO. | : 18/882256 | |
| DATED | : September 23, 2025 | |
| INVENTOR(S) | : John Francis Quanci et al. | |

It is certified that error appears in the above-identified patent and that said Letters Patent is hereby corrected as shown below:

On the Title Page

On Page 2, Column 2, item (56) Foreign Patent Documents, Line 4, delete "107385135" and --107385153-- therefor.

In the Specification

In Column 6, Line 43, Detailed Description, delete "handing" and insert --handling-- therefor.

In the Claims

In Column 20, Line 56, in Claim 20, delete "wt" and insert --wt.-- therefor.

Signed and Sealed this
Thirteenth Day of January, 2026

John A. Squires
*Director of the United States Patent and Trademark Office*